US008689223B2

(12) United States Patent
Dadhich et al.

(10) Patent No.: US 8,689,223 B2
(45) Date of Patent: Apr. 1, 2014

(54) MECHANISMS TO DETECT PRIORITY INVERSION

(75) Inventors: Pankaj K. Dadhich, Bhilwara (IN); Sravan K. Lakkimsetti, Rajahmundry (IN)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 12/273,033

(22) Filed: Nov. 18, 2008

(65) Prior Publication Data

US 2010/0125848 A1 May 20, 2010

(51) Int. Cl.
*G06F 9/48* (2006.01)

(52) U.S. Cl.
USPC ............... 718/103; 718/104; 712/227

(58) Field of Classification Search
USPC ............ 718/103, 104, 105; 712/214, 227
See application file for complete search history.

(56) References Cited

U.S. PATENT DOCUMENTS

| | | | | |
|---|---|---|---|---|
| 4,110,823 | A * | 8/1978 | Cronshaw et al. | 711/147 |
| 5,390,305 | A * | 2/1995 | Takahashi et al. | 712/244 |
| 5,903,718 | A * | 5/1999 | Marik | 714/38.13 |
| 6,681,384 | B1 | 1/2004 | Bates et al. | |
| 7,185,320 | B2 * | 2/2007 | Gouriou et al. | 717/130 |
| 7,530,053 | B2 * | 5/2009 | Pugh et al. | 717/124 |
| 7,765,547 | B2 * | 7/2010 | Cismas et al. | 718/100 |
| 7,917,909 | B2 * | 3/2011 | Stall | 718/106 |
| 8,069,371 | B2 * | 11/2011 | Sengupta et al. | 714/37 |
| 2004/0243979 | A1 * | 12/2004 | Pugh et al. | 717/124 |
| 2005/0066308 | A1 * | 3/2005 | Han | 717/124 |
| 2006/0282836 | A1 | 12/2006 | Barker | |
| 2007/0101327 | A1 * | 5/2007 | Burdick et al. | 718/100 |
| 2007/0288939 | A1 * | 12/2007 | Stall | 719/328 |
| 2008/0005737 | A1 | 1/2008 | Saha et al. | |
| 2009/0094581 | A1 * | 4/2009 | Bates et al. | 717/125 |

FOREIGN PATENT DOCUMENTS

| JP | 02066640 A | * | 3/1990 |
|---|---|---|---|
| JP | 2009098907 A | * | 5/2009 |

OTHER PUBLICATIONS

Helmy, Tarek and Jafri, Syed S. "Avoidance of Priority Inversion in Real Time Systems Based on Resource Restoration". © 2006 Technomathematics Research Foundation. International Journal of Computer Science and Applications vol. III, No. I, pp. 40-50.*
Welc, Adam; Hosking, Antony; and Jagannathan, Suresh. "Preemption-Based Avoidance of Priority Inversion for Java". © 2004 IEEE. International Conference on Parallel Processing (ICPP'04).*
Ong, Emil. "Priority Inversion and Donation". © 2003. http://www.cs.berkeley.edu/~kamil/teaching/sp04/pri/.*
National Instruments. "Avoiding Shared Resources and Priority Inversions for Deterministic Applications". © 2006. http://zone.ni.com/devzone/cda/tut/p/id/3898.*
A. Welc, et al., "Preemption-Based Avoidance of Priority Inversion for Java". 2004 IEEE; International Conference on Parallel Processing (ICPP '04); pp. 1-10.

* cited by examiner

*Primary Examiner* — Aimee Li
(74) *Attorney, Agent, or Firm* — Cantor Colburn LLP (57) ABSTRACT

A method, computer program product, and device are provided for detecting and identifying priority inversion. A higher priority thread and a lower priority thread are received. A debugging application for debugging is executed. The lower priority thread requests and holds a resource. A break point is hit by the lower priority thread. The lower priority thread is preempted by the higher priority thread, and debugging stops until the higher priority thread completes. The higher priority thread requests the resource being held by the lower priority thread. It is determined whether priority inversion occurs.

20 Claims, 5 Drawing Sheets

MECHANISMS TO DETECT PRIORITY INVERSION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments generally relate to computers and computer software, and more particularly relate to debugging multi-threaded software.

Locating, analyzing, and correcting suspected faults, called "bugs", in a computer program is a process known as "debugging." Typically, a programmer uses a tool commonly known as a "debugger" to debug a program under development.

Conventional debugging tools typically support two primary operations to assist a computer programmer. A first operation supported by conventional debuggers is a "step" function, which permits a programmer to process instructions (also known as "statements") in a computer program one-by-one and to see the results upon completion of each instruction. While the step function provides a programmer with a large amount of information about a program during its execution, stepping through hundreds or thousands of program instructions can be extremely tedious and time consuming, and might require a programmer to step through many error-free instructions before a set of suspicious instructions to be analyzed are executed.

To address this difficulty, a second operation supported by conventional debuggers is a break-point function, which permits a programmer to identify with a break-point the precise instruction at which the programmer desires to halt execution of the program. As a result, the debugger executes the program in a normal fashion until a break-point is reached, and then the debugger stops execution and displays the results of the program to the programmer for analysis.

Typically, step operations and break-points are used together to simplify the debugging process. Specifically, the programmer sets a break-point at the beginning of a desired set of instructions to be analyzed and then begins executing the program. Once the break-point is reached, the debugger halts the program, and the programmer then steps through the desired set of instructions line-by-line using the step function in the debugger. Consequently, a programmer is able to quickly isolate and analyze a particular set of instructions without needing to step through irrelevant portions of a computer program.

The break-point and step operations work well when the entire program being debugged runs in a single thread. But, some operating systems allow multiple parts, or threads, of one or more programs to run simultaneously. These operating systems are referred to as multi-threaded, which is a type of parallel processing that allows for more straightforward software design and faster execution of such programs on multi-processor computers.

Debugging multi-threaded computer programs is difficult since timing (i.e., synchronization) problems between the threads can occur, which can be very difficult to reproduce. For example, the debugging environment might interfere with the synchronization of the threads. Many reasons for this interference with the synchronization can be present. For example, the computer system upon which the computer program is being debugged might have different performance characteristics than the intended, ultimate host for the computer program. Also, the debugging environment includes additional monitoring and control over program execution, which can impede the intended execution of threads.

Not only do debuggers introduce synchronization problems, but the programmer might be interested in evaluating specific synchronization situations that could possibly occur. But, the programmer does not want to alter the design of the program to force a specific, synchronization situation; instead, the programmer wants a temporary synchronization debugging method. For example, the programmer might want to evaluate how the computer program would behave when multiple threads of interest are utilizing sections of code simultaneously.

Another reason why thread synchronization during debugging might be necessary is when an incomplete computer program is being debugged. The amount of code in a computer program can be enormous, so programmers often combine a top-down design technique with a bottom-up testing technique because it would be impractical to wait for the entire computer program to be available in order to test it. Using the top-down design approach, each subfunction within the program is defined, including the interfaces to other subfunctions. A programmer would then write the lower-tier sections of the computer program, such as modules. Using the bottom-up testing approach, as these lower-tier sections are completed, larger amounts of the computer program are debugged. Sections or modules of a computer program that are not yet complete are merely represented with "stubs" in order to exercise the defined interfaces.

Unfortunately, synchronization situations expected in the full computer program can be difficult to replicate in the incomplete computer program because such stubs would not perform like the full computer program. For example, a stub routine called by the computer program might only return a constant value whereas the real routine, when later available, would perform a number of calculations and processing steps that would delay such a response. The programmer would like to synchronize execution of a thread executing this stub routine to be more like the expected performance, but does not want to waste time developing elaborate code for the stub that would ultimately be discarded.

Moreover, priority inversion can cause deadlock in systems but since priority inversion is not easy to detect during testing phase, priority inversion can go unnoticed. When priority inversion problems are detected during runtime, however, addressing these problems requires a lot of effort and money and sometimes product recalls. A classic example of this case is the PathFinder rover sent by NASA to probe on Mars. The PathFinder rover had a priority inversion problem, which caused a deadlock. NASA had to debug the software using a remote connection, create a new image, and upload it. NASA was fortunate in this case because NASA did not remove debug facilities before launch.

Thus, a need exists for detecting priority inversion problems in multi-threaded software so that the priority of threads can be properly controlled.

SUMMARY

In accordance with exemplary embodiments, a method for detecting and identifying priority inversion. A higher priority thread and a lower priority thread are received. A debugging application for debugging is executed. The lower priority thread requests and holds a resource. A break point is hit by the lower priority thread. The lower priority thread is preempted by the higher priority thread, and debugging stops until the higher priority thread completes. The higher priority thread requests the resource being held by the lower priority thread. It is determined whether priority inversion occurs.

System, devices, and computer program products corresponding to the above-summarized methods are also described and claimed herein.

Additional features through the techniques of exemplary embodiments. For a better understanding of exemplary embodiments with features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments of the invention, together with features, by way of example with reference to the drawings.

DETAILED DESCRIPTION OF EXEMPLARY EMBODIMENTS

Exemplary embodiments provide a mechanism to use priority based breaks in execution of different threads, where the priorities of the threads can be changed in debug mode. Then, the programmer (or a debug application) can identify the priority inversion cases and rectify the design to avoid those priority inversion cases.

Exemplary embodiments use the priority associated with the different threads for debugging purposes. For the breakpoints in debugging, the thread priority is associated to the breakpoints as breakpoint priority for that thread. Then, whenever a high priority breakpoint will cause an execution to break, at that instant, all low priority threads (which have lower priority breakpoints than the high priority breakpoint) will also break. In the vice versa case in which a low priority breakpoint will cause execution to break, at that instant, all high priority threads will continue to run. In the case of middle priority threads, all low priority threads will break but high priority threads will continue to run. By this way, exemplary embodiments can associate different priorities to different thread breaks during debugging time and can debug the threads in such a manner that can identify priority inversion situations or deadlock situations before the software program launching to the field.

Although some RTOS (Real-Time Operating Systems) (such as, e.g. VxWorks, WindowsCE, Nucleus, SymbianOS, etc.) provide a priority inheritance mechanism to resole this issue, priority inheritance has more overheads and results an increases foot print also. However, exemplary embodiments help to detect and avoid the priority inversion problems before the software program is launched. Further, exemplary embodiments help in the identification of priorities for tasks and threads.

Figure 1:
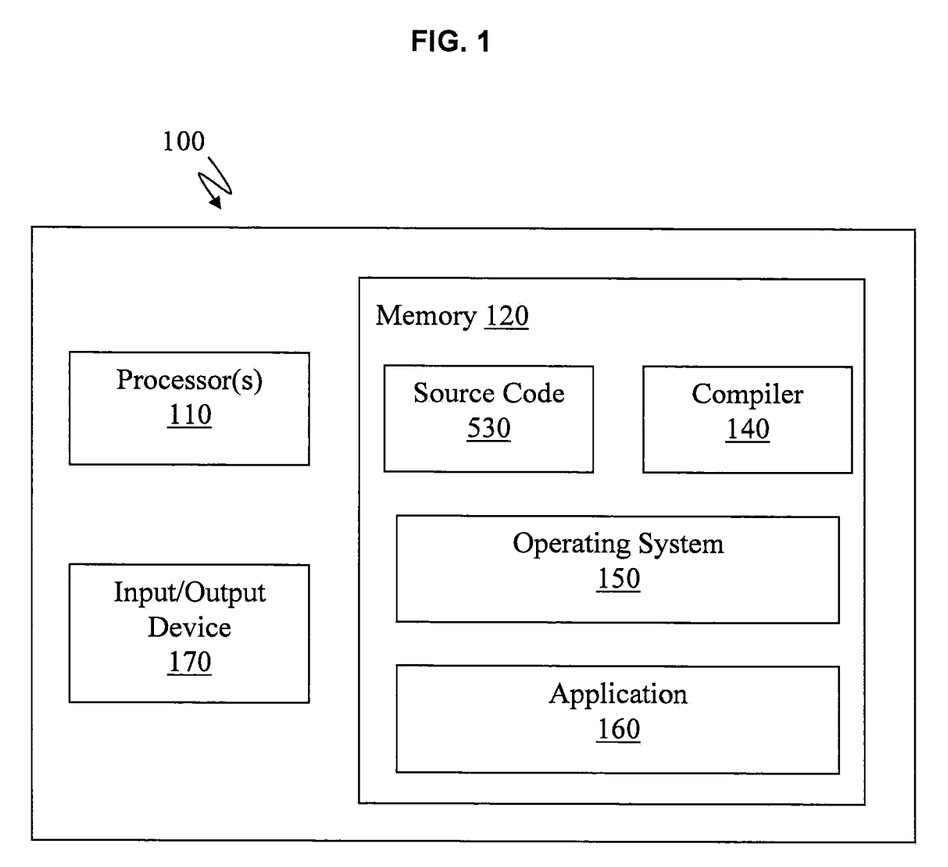
FIG. 1 illustrates an example of a computer having capabilities, which may be included in exemplary embodiments.

FIG. 1 illustrates an example of a computer 100 having capabilities, which may be included in exemplary embodiments. One or more of the capabilities of the computer 100 may be incorporated in any element, module, or component discussed herein. The computer 100 includes, but is not limited to, PCs, workstations, laptops, PDAs, palm devices, servers, and the like.

Generally, in terms of hardware architecture, the computer 100 may include one or more processors 110, memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

Further regarding FIG. 1, the processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor.

The memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the memory 120 may include one or more separate programs, each of which comprises an ordered listing of executable instructions for implementing logical functions. The software in the memory 120 includes a suitable operating system (O/S) 150, compiler 140, source code 530, and application(s) 160 in accordance with exemplary embodiments. As illustrated, the application 160 comprises numerous functional components for implementing the features and operations of the exemplary embodiments. The application 160 of the computer 100 may represent various applications, computational units, logic, functional units, processes, operations, virtual entities, and/or modules in accordance with exemplary embodiments, but the application 160 is not meant to be a limitation.

The operating system 150 controls the execution of other computer programs, and provides scheduling, input-output control, file and data management, memory management, and communication control and related services. It is contemplated by the inventors that the application 160 for implementing exemplary embodiments may be applicable on all commercially available operating systems.

The application 160 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 170 may include input devices such as, for example but not limited to, a mouse, keyboard, scanner, microphone, camera, etc. Furthermore, the I/O devices 170 may also include output devices, for example but not limited to a printer, display, etc. Finally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or intranet.

If the computer 100 is a PC, workstation, intelligent device or the like, the software in the memory 120 may further include a basic input output system (BIOS) (omitted for simplicity). The BIOS is a set of essential software routines that initialize and test hardware at startup, start the O/S 150, and support the transfer of data among the hardware devices. The BIOS is stored in some type of read-only-memory, such as ROM, PROM, EPROM, EEPROM or the like, so that the BIOS can be executed when the computer 100 is activated.

When the computer 100 is in operation, the processor 110 is configured to execute software stored within the memory 120, to communicate data to and from the memory 120, and to generally control operations of the computer 100 pursuant to the software. The application 160 and the O/S 150 are read, in whole or in part, by the processor 110, perhaps buffered within the processor 110, and then executed.

When the application 160 is implemented in software it should be noted that the application 160 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 160 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
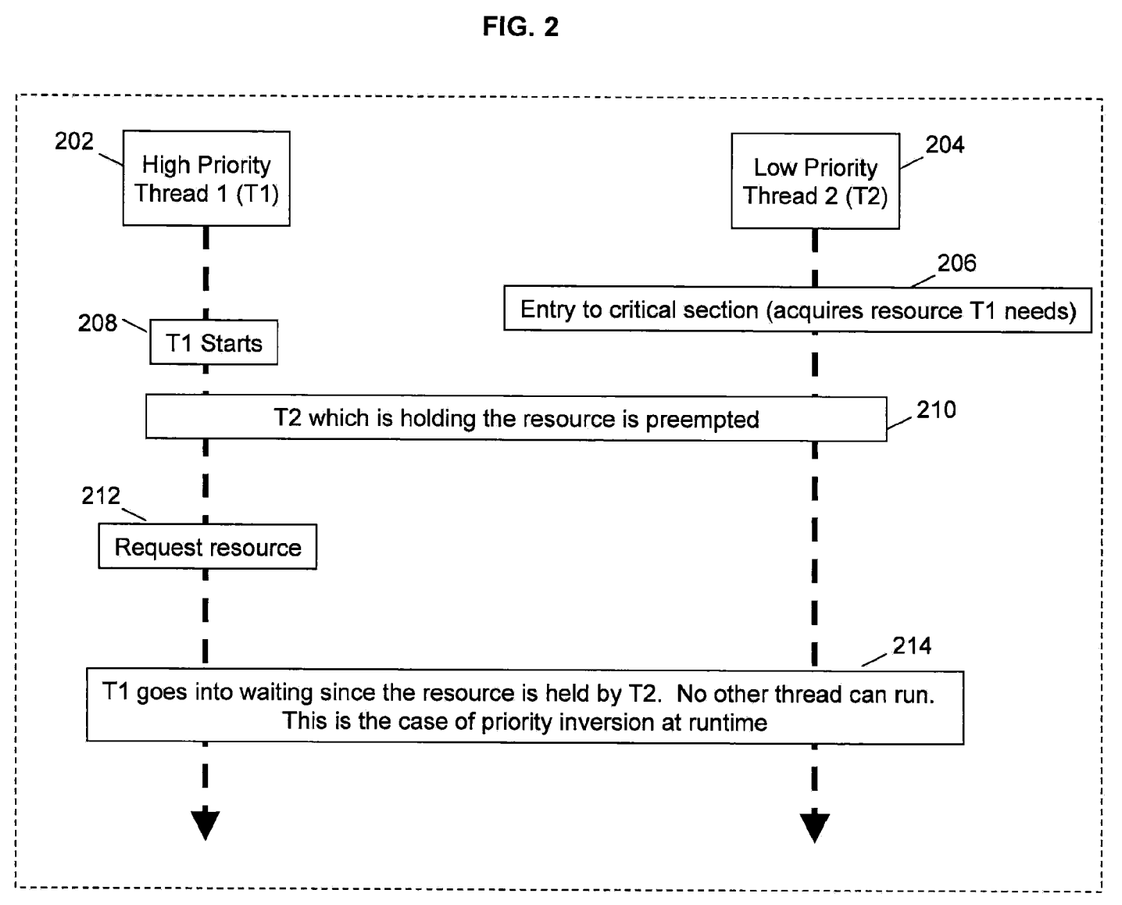
FIG. 2 is a diagram that illustrates priority inversion at runtime.

FIG. 2 is a diagram that illustrates priority inversion at runtime. FIG. 2 shows a high priority thread 1 (T1) 202 and a low priority thread 2 (T2) 204. The low priority thread T2 204 enters a critical section and acquires a resource that the high priority thread Ti 202 needs at 206.

The high priority thread T1 202 starts at 208. The low priority thread T2 204 (which holds the resource) is pre-empted at 210. The high priority thread T1 202 requests the resource being held by the low priority thread T2 204 at 212.

The high priority threads T1 202 waits for the resource being held by the low priority thread T2 204 and no other thread can run at 214. This example illustrates a case of priority inversion at runtime.

Figure 3:
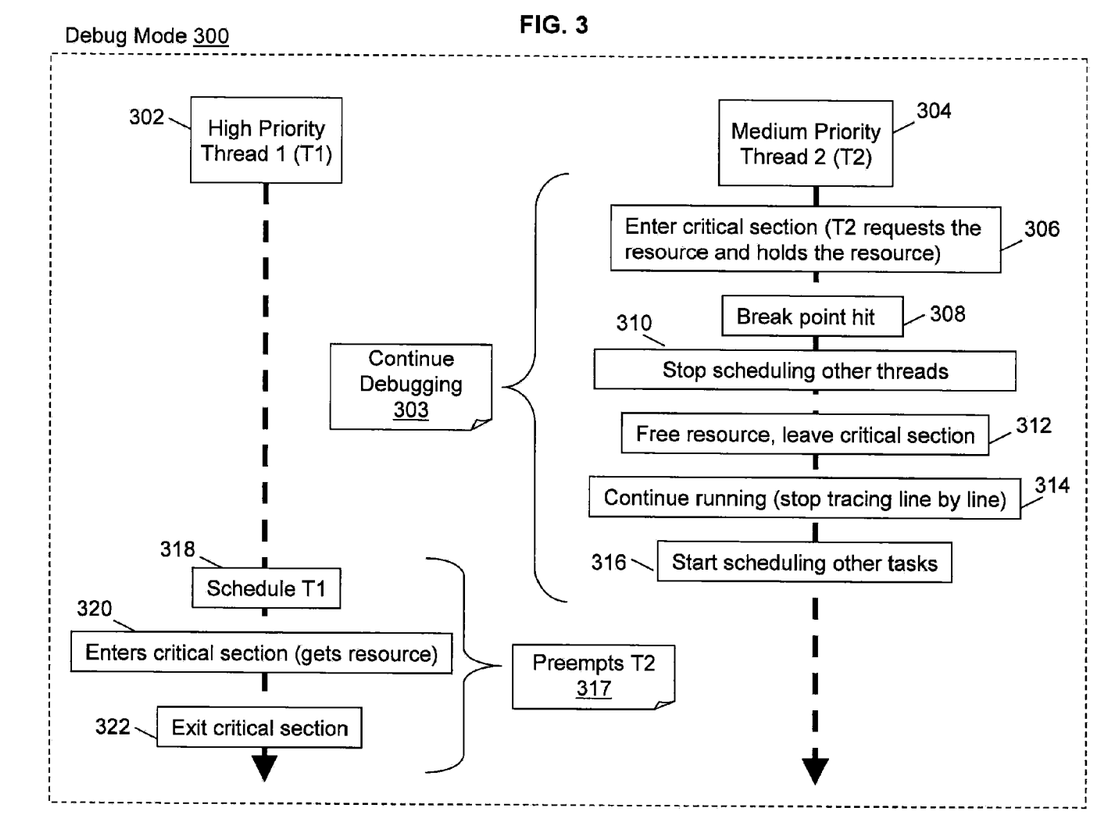
FIG. 3 is a diagram a debugger.

FIG. 3 is a diagram of a debugger 300. FIG. 3 shows an example of how the flow passes through priority inversion when the debugger 300 fails to recognize priority inversion.

FIG. 3 illustrates a high priority thread 1 (T1) 302 and a medium priority thread 2 (T2) 304. The medium priority thread (T2) enters a critical section, requests the resource, and holds the resource at 306. The medium priority thread T2 304 hits a break point at 308. The debug mode 300 stops scheduling other threads at 310. The debug mode 300 can free the resource and leave the critical section at 312. The debug mode 300 continues running and stops tracing line by line at 314. The debug mode 300 starts scheduling other tasks at 316. As seen in FIG. 3, the debug mode 300 continues debugging at 303.

The debugger 300 schedules the high priority thread T1 302 at 318. The high priority thread T1 302 enters the critical section and gets the resource at 320. The high priority thread T1 302 exits the critical section at 322. In other words, the high priority thread T1 preempts the medium priority thread T2 304 at 317.

Figure 4:
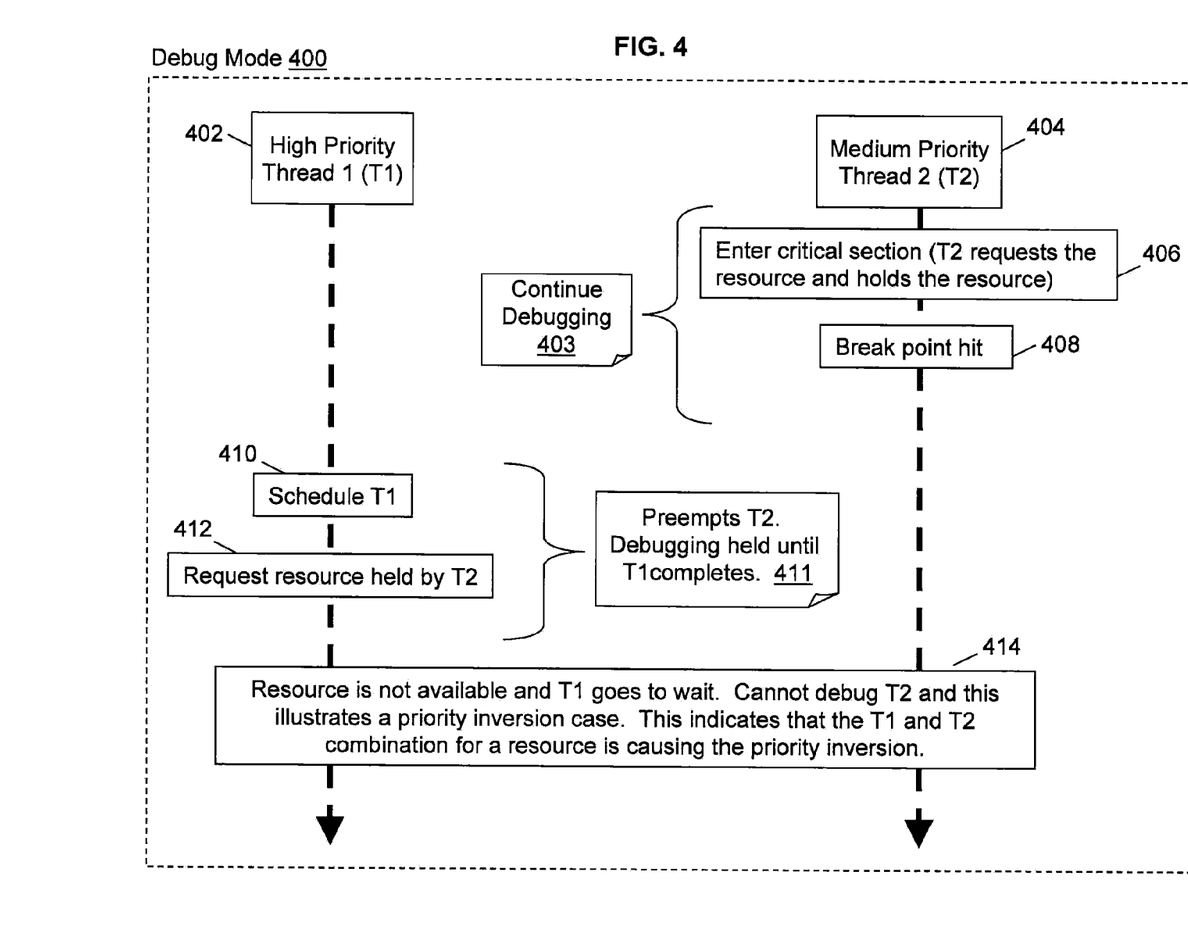
FIG. 4 illustrates an example of detecting priority inversion in accordance with exemplary embodiments.

FIG. 4 illustrates a diagram of an example for detecting priority inversion in accordance with exemplary embodiments. FIG. 4 illustrates a debug mode 400 in accordance with exemplary embodiments.

FIG. 4 illustrates a high priority thread (T1) 402 and a medium priority thread 2 (T2). T2 404 enters a critical section in which T2 404 requests a resource and holds the resource at 406. A break point is hit at 408. Debugging continues 403 of the debug mode 400.

The high priority thread 1 (T1) is scheduled at 410. The debug mode requests the resource held by T2 at 412. In FIG. 4, T1 preempts T2 and debugging is held until T1 completes at 411.

The resource is not available so T1 goes to wait; the debug mode 400 cannot debug T2 and this illustrates a priority inversion case in which the T1 and T2 combination for a resource is causing the priority inversion at 414.

The application 160 is configured to implement the debug mode 400 in accordance with exemplary embodiments.

To further illustrate exemplary embodiments, the following assumptions are made as an example:

\*\*\*

1) T1, T2, T3 . . . Tk . . . Tn are threads executing in a system. <T> is a thread pool which contain T1 . . . Tn.
2) B1, B2, B3 . . . Bk . . . Bn are exiting breakpoints put in by the programmer for the debugging application (such as the application 160). <B> is a breakpoint pool which contains B1 . . . Bn.
3) R1, R2, R3 . . . Rk . . . Rn are the resources available, which may include preemptive and non-preemptive resources. <R> is a resource pool which contains R1 . . . Rn.
4) T1>T2>T3> . . . >Tk> . . . >Tn is the order of priority.
5) As B1, B2, B3 . . . Bk . . . Bn are associated with respective threads T1, T2, T3 . . . Tk . . . Tn, then the default priority of breakpoints according to exemplary embodiments will be according to the breakpoint's respective thread priority. So B1>B2> . . . Bk . . . Bn.
6) The breakpoint priority can be changed for different threads such that all the priority inversion cases can be detected.

\*\*\*

Now suppose when Tk breaks at Bk holding the resource Rk, the system (e.g., the computer 100 via the application 160) will break all the threads from Tk+1, Tk+2 Tn but the system will continue to run the threads from T1, T2 . . . Tk−1. So, if any of the threads, e.g., Tm from T1, T2 . . . Tk−1, needs the resource Rk in its critical section then the threads will go to wait state and the system (via the application 160 or an administrator) can easily detect that the Tm and Tk combination of threads is causing the priority inversion. Since the priority inversion situation is detected (recognized), this in turns causes the application 160 ("watchdog") to come in and reset the whole system.

Figure 5:
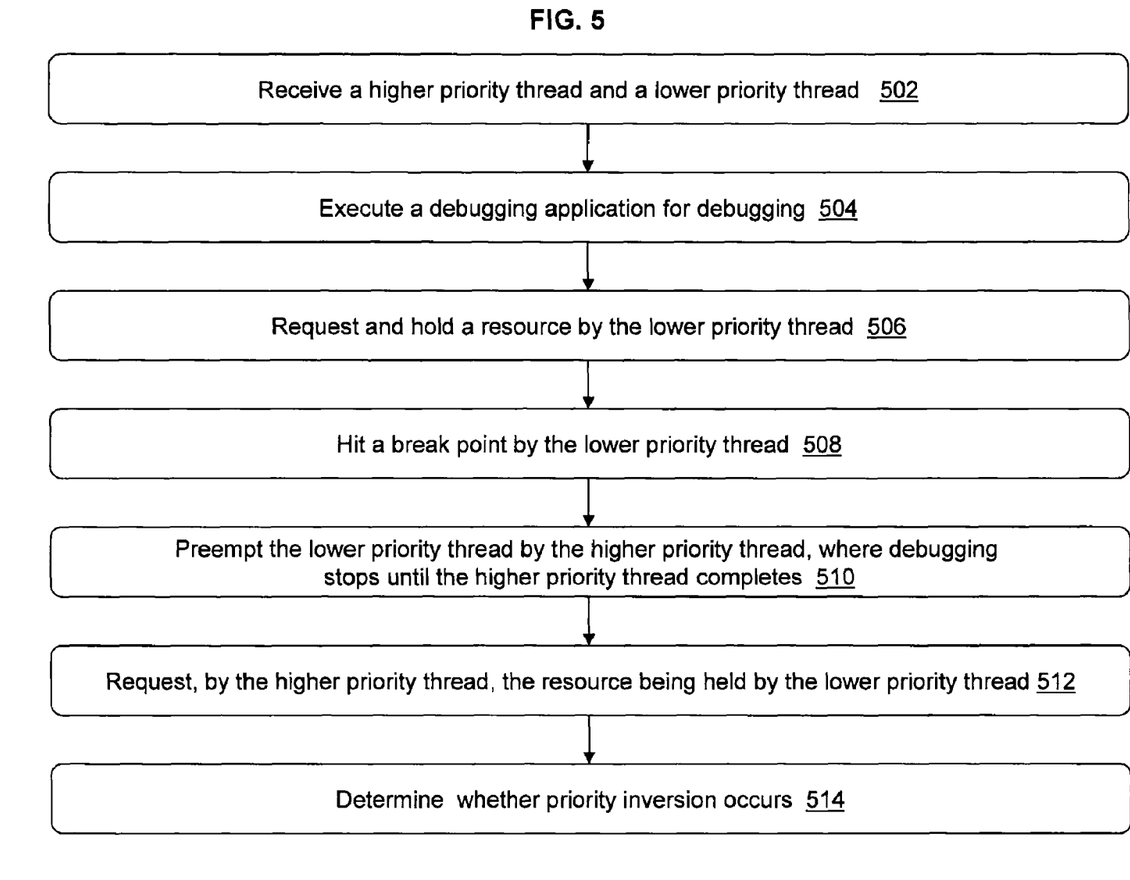
FIG. 5 illustrates a method for detecting priority inversion in accordance with exemplary embodiments.

FIG. 5 illustrates a method for detecting and identifying priority inversion in accordance with exemplary embodiments. The method can be implemented in the computer (system) 100 via the application 160 in accordance with exemplary embodiments.

A higher priority thread and a lower priority thread are received at 502.

A debugging application for debugging is executed at 504.

The lower priority thread requests and holds a resource at 506.

A break point is hit by the lower priority thread at 508.

The lower priority thread is preempted by the higher priority thread, and debugging stops until the higher priority thread completes at 510. However, in the conventional debugging, all the threads would be stopped the moment breakpoint is hit, and there would be no more scheduling of higher priority threads, which actually removes the possibility of hitting the priority inversion condition completely. By using techniques of the debugging mode in exemplary embodiments, we are allowing the user to hit the priority inversion condition explicitly.

The higher priority thread requests the resource being held by the lower priority thread at 512.

It is determined whether priority inversion occurs at 514.

Also, the resource is not available for the higher priority thread, and the higher priority thread goes to wait. The application 160 can detect that priority inversion occurs by the higher priority thread waiting for the resource being held by the lower priority thread.

The higher priority thread is unsuccessful in the high priority thread's request for the resource because the lower priority thread continues to hold the resource. The higher priority thread does not complete since the resource is being held by the lower priority thread. Also, the lower priority thread does not release the resource. The lower priority thread requests and holds the resource after entering a critical section.

It is understood that the computer 100 includes non-limiting examples of software and hardware components that may be included in various devices and systems discussed herein, and it is understood that additional software and hardware components may be included in the various devices, modules, and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for identifying priority inversion, comprising:
receiving a higher priority thread;
receiving a lower priority thread;
executing a debugging application for debugging;
requesting and holding a resource by the lower priority thread;
hitting a break point by the lower priority thread;
preempting the lower priority thread by the higher priority thread, wherein debugging stops until the higher priority thread completes;
requesting, by the higher priority thread, the resource being held by the lower priority thread; and
determining whether priority inversion occurs;

wherein a priority of the higher priority thread and the lower priority thread are configured to be changed during a debug mode;

associating break point priority to the higher priority thread, a middle priority thread, and to the lower priority thread, in which when the higher priority thread hits its high priority breakpoint, the high priority break point causes all lower priority threads to break including the middle priority thread and the lower priority thread;

wherein when the middle priority thread hits its middle priority break point, the lower priority thread breaks while the higher priority thread continues running to identify priority inversion.

2. The method of claim 1, wherein the resource is not available for the higher priority thread, and wherein the higher priority thread goes to wait;

wherein a default priority for the break point priority is according to a corresponding priority of an associated thread.

3. The method of claim 2, further comprising:

detecting that priority inversion has occurred by recognizing that the higher priority thread is waiting for the resource being held by the lower priority thread.

4. The method of claim 2, wherein the higher priority thread is unsuccessful in the high priority thread's request for the resource because the lower priority thread continues to hold the resource.

5. The method of claim 1, wherein the higher priority thread does not complete since the resource is being held by the lower priority thread.

6. The method of claim 1, wherein the lower priority thread does not release the resource.

7. The method of claim 1, wherein the lower priority thread requests and holds the resource after entering a critical section.

8. A computer program product, tangibly embodied on a non-transitory computer readable medium, for identifying priority inversion, the computer program product including instructions for causing a computer to execute a method, comprising:

receiving a higher priority thread;

receiving a lower priority thread;

executing a debugging application for debugging;

requesting and holding a resource by the lower priority thread;

hitting a break point by the lower priority thread;

preempting the lower priority thread by the higher priority thread, wherein debugging stops until the higher priority thread completes;

requesting, by the higher priority thread, the resource being held by the lower priority thread; and determining whether priority inversion occurs;

wherein a priority of the higher priority thread and the lower priority thread are configured to be changed during a debug mode;

associating break point priority to the higher priority thread, a middle priority thread, and to the lower priority thread, in which when the higher priority thread hits its high priority breakpoint, the high priority break point causes all lower priority threads to break including the middle priority thread and the lower priority thread;

wherein when the middle priority thread hits its middle priority break point, the lower priority thread breaks while the higher priority thread continues running to identify priority inversion.

9. The computer program product of claim 8, wherein the resource is not available for the higher priority thread, and wherein the higher priority thread goes to wait.

10. The computer program product of claim 9, further comprising:

detecting that priority inversion has occurred by recognizing that the higher priority thread is waiting for the resource being held by the lower priority thread.

11. The computer program product of claim 9, wherein the higher priority thread is unsuccessful in the high priority thread's request for the resource because the lower priority thread continues to hold the resource.

12. The computer program product of claim 8, wherein the higher priority thread does not complete since the resource is being held by the lower priority thread.

13. The computer program product of claim 8, wherein the lower priority thread does not release the resource.

14. The computer program product of claim 8, wherein the lower priority thread requests and holds the resource after entering a critical section.

15. A computing device configured to identify priority inversion, the computer comprising:

a processor;

memory coupled to the processor, an application being resident in the memory and executing on the processor, the application comprising instructions to cause the processor to:

receive a higher priority thread;

receive a lower priority thread;

execute a debugging application for debugging;

request and hold a resource by the lower priority thread;

hit a break point by the lower priority thread;

preempt the lower priority thread by the higher priority thread, wherein debugging stops until the higher priority thread completes;

request, by the higher priority thread, the resource being held by the lower priority thread; and determine whether priority inversion occurs;

wherein a priority of the higher priority thread and the lower priority thread are configured to be changed during a debug mode;

associating break point priority to the higher priority thread, a middle priority thread, and to the lower priority thread, in which when the higher priority thread hits its high priority breakpoint, the high priority break point causes all lower priority threads to break including the middle priority thread and the lower priority thread;

wherein when the middle priority thread hits its middle priority break point, the lower priority thread breaks while the higher priority thread continues running to identify priority inversion.

16. The computing device of claim 15, wherein the resource is not available for the higher priority thread, and wherein the higher priority thread goes to wait.

17. The computing device of claim 16, further comprising:

detecting that priority inversion has occurred by recognizing that the higher priority thread is waiting for the resource being held by the lower priority thread.

18. The computing device of claim 16, wherein the higher priority thread is unsuccessful in the high priority thread's request for the resource because the lower priority thread continues to hold the resource.

19. The computing device of claim 15, wherein the higher priority thread does not complete since the resource is being held by the lower priority thread.

20. The computing device of claim 15, wherein the lower priority thread does not release the resource.

* * * * *